United States Patent
Hodgson

(10) Patent No.: US 8,246,841 B2
(45) Date of Patent: Aug. 21, 2012

(54) VIBRATIONAL SEPARATION OF PARTICLES FROM VISCOUS MATERIALS

(75) Inventor: Kevin Hodgson, Holmrook (GB)

(73) Assignee: British Nuclear Fuels PLC (GB)

( * ) Notice: Subject to any disclaimer, the term of this patent is extended or adjusted under 35 U.S.C. 154(b) by 0 days.

(21) Appl. No.: 12/859,839

(22) Filed: Aug. 20, 2010

(65) Prior Publication Data
US 2010/0314332 A1      Dec. 16, 2010

Related U.S. Application Data

(63) Continuation of application No. 11/908,987, filed on Jul. 15, 2008, now abandoned.

(30) Foreign Application Priority Data

Mar. 30, 2005 (GB) .................................. 0506332.6

(51) Int. Cl.
*B01D 37/00* (2006.01)
(52) U.S. Cl. .......... 210/780; 210/767; 209/49; 209/443; 209/479; 588/20
(58) Field of Classification Search ........................ None
See application file for complete search history.

(56) References Cited

U.S. PATENT DOCUMENTS

| | | | | |
|---|---|---|---|---|
| 2,163,249 A * | 6/1939 | Sherwen | ........................ | 209/368 |
| 2,444,134 A * | 6/1948 | Hittson | ........................... | 310/30 |
| 2,610,726 A * | 9/1952 | Howard | ........................ | 198/535 |
| 2,694,156 A * | 11/1954 | Cerminara | ...................... | 310/19 |
| 2,958,228 A * | 11/1960 | Carrier, Jr. et al. | ................ | 74/26 |
| 2,968,424 A * | 1/1961 | Lawson | ........................ | 222/161 |
| 3,042,181 A * | 7/1962 | Rise | ........................... | 198/391 |
| 3,226,989 A * | 1/1966 | Robins | ........................ | 74/87 |
| 3,251,457 A * | 5/1966 | Dumbaugh | ................... | 198/762 |
| 3,252,703 A * | 5/1966 | Peugnet | ....................... | 271/210 |
| 3,559,984 A * | 2/1971 | Westra | ......................... | 271/210 |
| 3,666,095 A * | 5/1972 | Krynock et al. | ............... | 209/254 |
| 3,881,605 A * | 5/1975 | Grossman | ..................... | 414/730 |
| 4,015,705 A * | 4/1977 | Dumbaugh | ................... | 198/770 |
| 4,062,768 A * | 12/1977 | Elliot | ........................... | 209/341 |
| 4,315,817 A * | 2/1982 | Popper | ......................... | 209/315 |

(Continued)

FOREIGN PATENT DOCUMENTS

BE    1006716    11/1994

(Continued)

OTHER PUBLICATIONS

"Magnox" downloaded from Wikipedia on Apr. 17, 2012; 8 pages.*

*Primary Examiner* — Robert James Popovics
(74) *Attorney, Agent, or Firm* — Marianee Fuierer; Moore & Van Allen, PLLC

(57) ABSTRACT

The invention provides a method for the separation of solids from a semi-solid viscous mass, the method comprising treating a solids-containing semi-solid viscous mass in an apparatus comprising a separating member incorporating a substantially flat solid surface and a supporting member, wherein the separating member is adapted to selectively impart directional momentum to the solids, thereby facilitating separation of the solids from the semi-solid viscous mass. Preferably the separating member comprises a substantially flat solid surface adapted for vibrational motion, the vibrational motion causing the solids material to be displaced from the remainder of the semi-solid viscous mass.

6 Claims, 2 Drawing Sheets

U.S. PATENT DOCUMENTS

| | | | |
|---|---|---|---|
| 4,369,874 A * | 1/1983 | Kettner et al. | 198/396 |
| 4,482,455 A * | 11/1984 | Humphrey | 209/319 |
| 4,749,891 A * | 6/1988 | Sheng | 310/15 |
| 5,122,331 A * | 6/1992 | Schukei et al. | 376/261 |
| 5,123,516 A * | 6/1992 | Moore | 198/396 |
| 5,191,904 A * | 3/1993 | Arents et al. | 131/96 |
| 5,205,999 A * | 4/1993 | Willis et al. | 423/20 |
| 5,223,181 A * | 6/1993 | Wilson et al. | 588/1 |
| 5,285,890 A * | 2/1994 | Stearns | 198/766 |
| 5,287,027 A * | 2/1994 | Marshall et al. | 310/21 |
| 5,571,408 A * | 11/1996 | Rising | 210/167.29 |
| 5,602,433 A * | 2/1997 | Brence et al. | 310/17 |
| 5,626,767 A | 5/1997 | Trampler et al. | |
| 5,678,241 A * | 10/1997 | Wilson et al. | 588/19 |
| 6,107,715 A * | 8/2000 | Patterson et al. | 310/81 |
| 6,112,883 A * | 9/2000 | Kraus et al. | 198/764 |
| 6,201,330 B1 * | 3/2001 | Patterson | 310/91 |
| 6,202,832 B1 * | 3/2001 | Evansic | 198/769 |
| 6,250,476 B1 * | 6/2001 | Kroon et al. | 209/272 |
| 6,415,913 B2 * | 7/2002 | Sleppy et al. | 198/766 |
| 6,461,523 B1 * | 10/2002 | Greenrose | 210/770 |
| 6,628,913 B2 * | 9/2003 | Matsumoto et al. | 399/258 |
| 6,629,610 B1 | 10/2003 | Adams et al. | |
| 6,652,757 B2 * | 11/2003 | Hodges et al. | 210/709 |
| 6,675,955 B2 * | 1/2004 | Nasser-Moghaddassi et al. | 198/769 |
| 6,773,612 B2 * | 8/2004 | Dias | 210/767 |
| 6,863,183 B2 * | 3/2005 | Schulte et al. | 209/405 |
| 6,899,807 B2 * | 5/2005 | Cummings | 210/97 |
| RE38,756 E * | 7/2005 | Kraus et al. | 198/764 |
| 6,953,529 B2 * | 10/2005 | Weir | 210/791 |
| 7,005,077 B1 * | 2/2006 | Brenner et al. | 210/770 |
| 7,018,532 B2 * | 3/2006 | Kaufman | 210/205 |
| 7,509,759 B2 * | 3/2009 | Langdon et al. | 37/307 |
| 7,712,513 B1 * | 5/2010 | Mitchell, III | 164/131 |
| 2002/0025196 A1 * | 2/2002 | Matsumoto et al. | 399/258 |
| 2005/0230293 A1 * | 10/2005 | Anderson | 210/106 |
| 2006/0070932 A1 * | 4/2006 | Gisquiere | 209/631 |
| 2006/0162195 A1 * | 7/2006 | Langdon et al. | 37/466 |
| 2009/0230062 A1 * | 9/2009 | Hodgson | 210/695 |
| 2010/0314332 A1 * | 12/2010 | Hodgson | 210/748.05 |

FOREIGN PATENT DOCUMENTS

| | | |
|---|---|---|
| DE | 3914205 C1 | 9/1999 |
| GB | 24260 | 0/1898 |
| GB | 337371 | 4/1929 |
| GB | 460125 | 1/1937 |
| GB | 1447714 | 8/1976 |
| GB | 2362837 | 12/2001 |
| SU | 1692028 | 6/1995 |
| WO | 89/02320 | 3/1989 |

* cited by examiner

VIBRATIONAL SEPARATION OF PARTICLES FROM VISCOUS MATERIALS

CROSS-REFERENCE TO RELATED APPLICATIONS

This application is a continuation of U.S. patent application Ser. No. 11/908,987 filed on Jul. 15, 2008, now abandoned, which was filed under the provisions of 35 U.S.C. §371 and claims the priority of International Patent Application No. PCT/GB2006/001154 filed on Mar. 29, 2006, which in turn claims priority of GB Patent Application No. 0506332.6 filed on Mar. 30, 2005, the contents of which are included herein.

FIELD OF THE INVENTION

The present invention relates to a method for the separation of waste materials. More specifically, it provides a rapid and convenient method for the separation of solid debris from wet sludges.

BACKGROUND TO THE INVENTION

In many industries, there is frequently a requirement for the separation of solid materials and objects from liquids, and many techniques are well known for achieving such separations. Depending upon the nature of the solids and liquids which require separation, and the quantities involved, methods such as sedimentation, centrifugation and, most commonly, filtration are generally appropriate to such situations and provide an efficient means of separating solid and liquid components.

On occasions, however, such methods may prove to be inappropriate to the task at hand, and alternative means of separation have to be found. Thus, for example, centrifugation may not always be applicable to large scale separations, whilst filtration is often problematical when handling particularly viscous liquids, since rates of filtration can be excruciatingly slow, making processes uneconomic; indeed, in extreme circumstances, the method may prove to be impossible to perform, since filter media become clogged and liquids are unable to pass through. Indeed, when mixtures of very high viscosity are involved, it is often impossible to achieve any sort of separation by means of filtration techniques, since it becomes impossible to find filter media of appropriate gauge to allow a liquid component to pass whilst retaining solid materials in the filter, so either the filtrate comprises all components, nothing is retained in the filter, and no separation is achieved, or the filter media becomes immediately blocked, with the same end result. Even the filtration technique often known as screening, which relics on filtration of a medium through coarse screens, can be prone to such difficulties. It is these problems with viscous media that the present invention seeks to address, by providing a method of separation which allows for the separation of solid components from such media.

A typical prior art method for dealing with such difficulties has been based on the reduction of the viscosity of these highly viscous media prior to attempting separation, and the simplest means to achieve such an objective is by dilution of the media. Most conveniently, of course, dilution is achieved by the addition of water, which is a simple and relatively cheap procedure. However, whilst such a course of action is often successful in facilitation separation of components, since the less viscous medium obtained is generally more readily subjected to processes such as filtration, the associated consequences are highly undesirable, since copious quantities of effluent—usually aqueous effluent—have to be dealt with following the separation process. Hence, a further consideration of the present inventors is the minimisation of effluent problems by the avoidance of dilution techniques in the method of the invention.

Thus, the present invention seeks to provide a method by which solid objects and components may, rapidly and efficiently, be separated and removed from viscous media, including highly viscous, non-filterable sludges. The invention also seeks to provide a method which provides a reliable and repeatable means of effecting the separation of such materials, and which is not prone to the failures commonly associated with the methods of the prior art in such circumstances.

The present inventors have investigated the use of mechanical forces which selectively impart momentum to the components of said media for the purpose of achieving the required separation and, somewhat surprisingly, have found that it is possible to achieve such separation by the application of vibrational technology, since it has been found that, in certain vibrational modes, a suitably disposed surface shows the degree of selectivity in imparting momentum which is required to achieve the separation of solid objects and components from viscous media.

STATEMENTS OF INVENTION

Thus, according to the present invention, there is provided a method for the separation of solids from a semi-solid viscous mass, said method comprising treating a solids-containing semi-solid viscous mass in an apparatus comprising a separating member incorporating a substantially flat solid surface and a supporting member, wherein said separating member is adapted to selectively impart directional momentum to said solids, thereby facilitating separation of said solids from said semi-solid viscous mass.

Said separating member is preferably attached to and supported by a supporting member such that said separating member is disposed at an angle close to, but slightly displaced from, the horizontal. Preferably, said separating member is disposed at an angle of between 1° and 10° from the horizontal, more preferably between 2° and 5°, most preferably around 3° from the horizontal.

Said separating member comprises a substantially flat solid surface, preferably comprising a tray or plate, the surface of which preferably demonstrates a different degree of adhesiveness to the solids than to the remainder of the semi-solid mass, thereby further facilitating the separation of the materials. Preferably, therefore, the material forming the surface of the separating member may be chosen to provide a separating member which allows for an additional degree of separation of the materials in question on the basis of the different adhesiveness of the solids and the remainder of the semi-solid mass. Said substantially flat solid surface does not comprise a screen or other porous surface, since the method of the present invention does not rely on filtration to achieve separation of the components of said solids-containing semi-solid viscous mass.

Said separating member is adapted to selectively impart directional momentum to the solids in the semi-solid viscous mass, and comprises a substantially flat solid surface adapted for vibrational motion. Thus, it is found that by applying a force to said separating member, so as to impart vibrational motion to said member, separation of solids from the remainder of the semi-solid mass is achieved rapidly and efficiently. Preferably, said vibrational motion is imparted to said member so as to impart directional momentum to said solid particulate material, and thereby cause its displacement in a substantially horizontal direction along said separating member and also in an upward direction away from the horizontal. In a particularly preferred embodiment said vibrational motion comprises a combination of vibrational motion in the plane of the separating member and in a direction perpendicular to the plane of the separating member; thus, the imparted vibrational motion comprises a combination of horizontal vibrational motion and vertical vibrational motion.

Said vibrational motion may be imparted by any convenient means, typically by the application of mechanical and/or electromagnetic forces using, for example, an out of balance motor drive or an electromagnet. Preferably, electromagnets are used for imparting vibrational motion, especially for smaller system, as they offer a better degree of control.

Typically, the frequency of the applied vibrational motion is in the region of from 5-50 Hz, preferably from 10-30 Hz, most preferably from 15-20 Hz, with amplitude in the plane of the separating member being in the region of from 2-30 mm, preferably 5-20 mm, most preferably 10-15 mm.

Preferably said separating member comprises a substantially flat solid surface comprising a tray or plate which additionally comprises perimeter members attached to the edges of said separating member and disposed substantially perpendicularly to said substantially flat solid surface, with the proviso that one edge of said separating member does not comprise a perimeter member. In this way, the separated solids are able to be removed from the separating member during operation, whilst the remainder of the semi-solid viscous mass is retained on said separating member. Preferably, in operation, the separating member is disposed with the edge that does not comprise a perimeter member above the horizontal.

In the most preferred embodiment, said separating member comprises a tray or plate which is rectangular in shape, and three of the four sides comprise a perimeter member, whilst the fourth side does not include a perimeter member. In operation, the separating member is disposed with said fourth side above the horizontal, such that the surface of the separating member slopes down from said fourth side to the parallel opposite side of the member, which is disposed below the horizontal. Preferably, said separating member is attached to the supporting member by means of the remaining two sides of the rectangular member, perpendicular to and adjacent said fourth side.

Said supporting member may be any member suitable to support said separating member such that said separating member is disposed at an angle close to, but slightly displaced from, the horizontal. Thus, any convenient form of support may be employed which provides the appropriate degree of strength and elevation above ground level.

Preferably, said separating member is movably attached to said supporting member. Most preferably, said separating member is rotatably attached to said supporting member, allowing for said separating member to be conveniently disposed at an angle slightly displaced from the horizontal. In the said embodiment, it is convenient, following removal of the solids, to reverse the angle of displacement of the separating member from the horizontal, such that the side which does not include a perimeter member is then disposed below the horizontal, thus allowing the remainder of the semi-solid viscous mass to be conveniently removed from said separating member.

In the context of the present invention, said solids-containing semi-solid viscous mass comprises a semi-solid mass of high viscosity, typically a sludge, and said solids may incorporate solid objects or substances, or solid particulate material. Thus, for example, the method of the invention is particularly suited to the removal of solid objects, such as machinery parts, from industrial sludges, small boulders from clay-like soils, discrete pieces of slate from slate sludges, and discrete solid objects from waste sludges. Specific applications of this type of separation are found in the nuclear industry, wherein the removal of solid debris from sticky sludges is a common requirement as, for example, in the treatment of corroded cladding from Magnox fuel.

DESCRIPTION OF THE INVENTION

Figure 1:
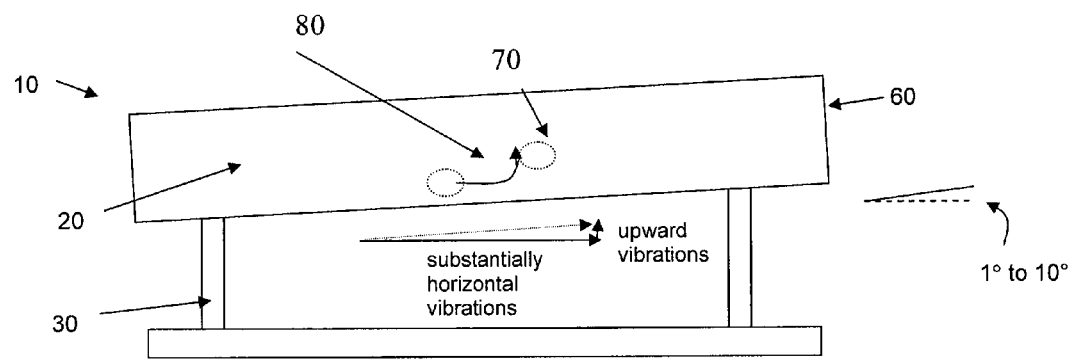
FIG. 1 illustrates a side view of a preferred embodiment of the apparatus (10) comprising a separating member (20) having a flat solid surface bottom (40) three sides (50) perpendicular to the bottom and an open end (60), as shown in FIGS. 2 and 3, and supporting members (30) attached to the separating member, wherein the separating member is positioned at an angle so that open end (60) is positioned above the horizontal plane and wherein directional vibrational motion is provided so that the separating member (20) moved through an arc having both a vertical component in an upward direction and a horizontal component in the direction of the fourth edge of the separating member for moving heavy particles (70) in an upward arcing movement (80).
Figure 2:
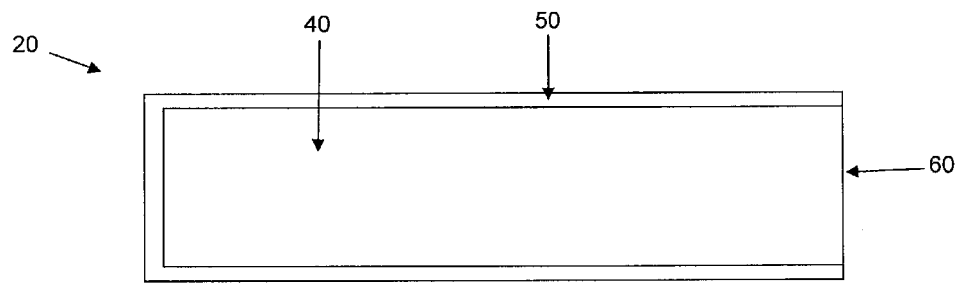
FIG. 2 illustrates a top view of the separating member (20) of the apparatus wherein the separating member comprises a substantially flat solid surface (40) and three perimeter members (50) that are disposed substantially perpendicular to the flat solid surface.
Figure 3:
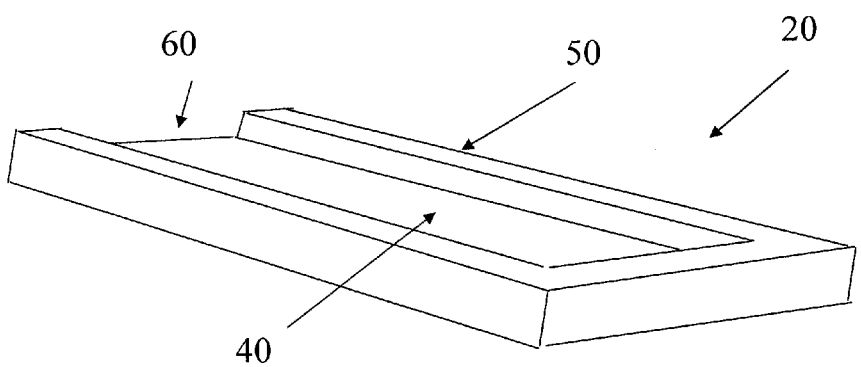
FIG. 3 illustrates a three-dimensional side view of the separating member of the apparatus showing the upward incline wherein end (60) is above the horizontal.

In a preferred embodiment of the present invention, the separating member comprises a substantially flat solid surface adapted for vibrational motion. In a particularly preferred embodiment said vibrational motion comprises a combination of vibrational motion in the plane of the separating member and in a direction perpendicular to the plane of the separating member.

In such an embodiment, the separating member comprises a tray which is mounted on a supporting member comprising inclined leaf springs. A semi-solid viscous mass which incorporated solids material is placed on the upper surface of said separating member. In operation, an electromagnet is used to impart the vibrational motion and the magnetic field is applied such that the separating member is pulled through an arc imparting vibrational motion having both a vertical component in an upwards direction, and a horizontal component in the direction of the edge of the separating member that does not comprise a perimeter member. Successful results may be obtained by operating at a frequency of 18 Hz with a horizontal amplitude of 10 to 12 mm.

Under the influence of such vibrational motion, the solids on the surface of the separating member leave contact with the said surface and are thrown forwards towards the edge of the member that does not comprise a perimeter member. As the process continues, the solids are thrown further in that direction and, therefore, eventually reach the edge of the member and are removed therefrom under the influence of gravity.

Thus, directional vibrational motion is provided by the inclination of the leaf springs, which thereby impart sufficient vertical acceleration to the solid material on the tray for it to be thrown upwards and forwards, whilst the remainder of the semi-solid viscous mass has insufficient rigidity to be thrown upwards in the same manner and, hence, the segregation effect occurs. In practice, it is also generally found that the sticky nature of semi-solid viscous materials results in their having significantly greater adhesion to the surfaces of separating members that is the case with solid materials, thereby further enhancing the separation process.

The method of the invention shows great advantages over the methods of the prior art in that it is able to provide rapid and efficient separation of solids from semi-solid viscous masses. It also avoids the necessity for the dilution of such viscous masses with copious amounts of water, which is designed to reduce their viscosity and improve the efficiency of separation. Whilst satisfactory separations have previously been obtained in this way, the increased volumes of effluent, as well as the higher resource and energy requirements of such procedures are extremely undesirable, and such disadvantages can be avoided by the use of the method of the present invention.

What is claimed is:

1. A method for the separation of solids from a semi-solid viscous mass including magnox fuel sludge, said method comprising:
   a) introducing a solid-containing semi-solid viscous mass including magnox fuel sludge in an apparatus, wherein the apparatus comprises:
      i) a separating member, wherein the separating member comprises a solid flat plate having four edge sides, wherein three of the four edges comprise a perimeter member wherein the fourth edge side does not include a perimeter member wherein the perimeter members are disposed substantially perpendicularly to the solid flat plate;
      ii) supporting members comprising leaf springs and attached to the separating member on two sides of the solid flat plate, wherein the supporting members are positioned perpendicular and adjacent to the fourth edge side and wherein in operation the fourth edge side is disposed above the horizontal and the solid flat plate slopes down from the fourth edge side to the parallel opposite side of the member which is disposed below the horizontal; and
      iii) mechanical or electromagnetic force means for vibrating the separating member thereby providing directional vibrational motion through inclination of the leaf springs positioned between the separating member and supporting member so that the separating member is moved through an arc imparting vibrational motion having both a vertical component in an upward direction and a horizontal component in the direction of the fourth edge of the separating member; and
   b) vibrating the solid-containing semi-solid viscous mass including magnox fuel sludge in the separating member to cause the solids on the surface of the separating member to leave contact with the surface and be thrown forwards towards the fourth edge of the separating member until the solids reach the edge and are removed under the influence of gravity, thereby facilitating separation of said solids from said semi-solid viscous mass without dilution of said semi-solid viscous mass.

2. The method as claimed in claim 1 wherein said separating member is disposed at an angle of between 1° and 10° from the horizontal.

3. The method as claimed in claim 1 wherein the surface of said solid flat plate is fabricated of a material that demonstrates a different degree of adhesiveness to the solids than to the remainder of the semi-solid mass.

4. The method as claimed in claim 1 wherein said mechanical or electromagnetic forces means is provided by an out of balance motor drive or an electromagnet, respectively, to provide vibrational motion.

5. The method as claimed in claim 4 wherein the applied vibrational motion has a frequency in the region of from 5 to 50 Hz.

6. The method as claimed in claim 1 wherein the vibrational motion has an amplitude in the plane of the separating member is in the region of from 2 to 30 mm.

* * * * *